(12) United States Patent
Greiff

(10) Patent No.: US 6,230,567 B1
(45) Date of Patent: May 15, 2001

(54) LOW THERMAL STRAIN FLEXURE SUPPORT FOR A MICROMECHANICAL DEVICE

(75) Inventor: Paul Greiff, Wayland, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 0 days.

(21) Appl. No.: 09/366,462

(22) Filed: Aug. 3, 1999

(51) Int. Cl.[7] ........................................ G01P 15/00
(52) U.S. Cl. ............................................. 73/514.37
(58) Field of Search ....................... 73/514.36, 514.37, 73/514.23

(56) References Cited

U.S. PATENT DOCUMENTS

| 5,126,812 | 6/1992 | Greiff . | |
|---|---|---|---|
| 5,581,035 | 12/1996 | Greiff . | |
| 5,635,739 | * 6/1997 | Greiff et al. | 257/254 |
| 5,646,348 | 7/1997 | Greiff et al. . | |
| 5,969,250 | * 10/1999 | Greiff | 73/514.38 |

* cited by examiner

Primary Examiner—Richard A. Moller
(74) Attorney, Agent, or Firm—Iandiorio & Teska

(57) ABSTRACT

A low thermal strain flexure support for a micromechanical device includes a substrate; a micromechanical device having a rotational axis and a longitudinal axis; an anchor structure disposed on the substrate proximate the longitudinal axis of the micromechanical device; first and second support members extending outwardly oppositely from the anchor structure; and first and second flexures extending inwardly in the direction of the axis of rotation of the micromechanical device from the first and second support members, respectively, to the micromechanical device for suspending the micromechanical device from the substrate.

8 Claims, 3 Drawing Sheets

LOW THERMAL STRAIN FLEXURE SUPPORT FOR A MICROMECHANICAL DEVICE

FIELD OF INVENTION

This invention relates to a low thermal strain flexure support for a micromechanical device.

BACKGROUND OF THE INVENTION

Flexure supports are used to suspend a micromechanical device from a substrate. In accelerometer and gyro applications the micromechanical device contains a proof mass. In pendulous accelerometers the proof mass is suspended from a substrate by flexures which extend beyond the longitudinal edges of the proof mass to anchors mounted on the substrate. A strain relief beam is formed in the flexure support region and this serves to minimize the fabrication stresses that are transferred to the proof mass from the substrate. In order to make the device both sensitive at the milli-g level and manufacturable with a single silicon thickness the flexure is narrow in width and has a high aspect ratio.

Although the strain relief beam used gives an acceptable level of stress on the proof mass, after fabrication the structure is not thermally stable: the anchor regions are spaced relatively far apart and there is a thermal stress imparted by the glass substrate to the flexures. The strain relief beam mitigates the situation from the standpoint of structural fracture but the concern is that small imperfections in the structure result in a rotational stress which tilts the proof mass under thermal load. Any tilt of this nature is differential and will show up as a bias drift. Such a tilt will likely be very small. However, the accelerometer is extremely sensitive.

Because of the inherent stability of silicon a millimeter sized device can routinely sense accelerations in the milli-g level. With the typical device dimensions used this means sensing an acceleration induced tilt of about 1 Angstrom per milli-g. In other words the device bias is extraordinarily sensitive to thermally induced rotation of the proof mass.

An attempt was made recently to support a micromechanical device or proof mass on a single anchor. In theory a single point mount will decouple all stress between the glass substrate and the silicon device. The single point mount is acceptable in a device which is very stiff and measures acceleration in the 10 to 100 g level, for example. However, when the flexures must be made weaker to sense acceleration at the milli-g level a problem develops with rotational stiffness. If a single thickness of silicon is used the flexure has high aspect ratio and a narrow width; the device becomes very weak in rotation, and has a low yield in fabrication due to breakage.

BRIEF SUMMARY OF THE INVENTION

It is therefore an object of this invention to provide an improved low thermal strain flexure support for a micromechanical device.

It is a further object of this invention to provide such an improved low thermal strain flexure support for a micromechanical device which can be made with a single layer etch resistant silicon process.

It is a further object of this invention to provide such an improved low thermal strain flexure support for a micromechanical device which can be made in a single layer process compatible with other low cost processes.

It is a further object of this invention to provide such an improved low thermal strain flexure support for a micromechanical device which provides the rotational stiffness comparable to that of "outboard" anchor designs but has approximately an order of magnitude lower thermal stress as induced by the thermal mismatch between substrate and micromechanical device.

It is a further object of this invention to provide such an improved low thermal strain flexure support for a micromechanical device which permits the distance between anchors to be substantially reduced.

It is a further object of this invention to provide such an improved low thermal strain flexure support for a micromechanical device which has lower noise, better bias stability, greater ruggedness, lower cost and can be applied to other designs and micromechanical devices.

The invention results from the realization that a truly reliable and improved low thermal strain flexure support for a micromechanical device such as a proof mass can be effected by folding the anchors inboard of the periphery of the proof mass so that the distance between the anchors is reduced thereby reducing differential thermal effects occurring between the substrate and proof mass but preserving the sensitivity and reducing rotational errors by employing support members which extend outwardly from the anchors to mount flexures which extend inwardly to suspend the proof mass from substrate.

This invention features a low thermal strain flexure support for a micromechanical device including a substrate and a micromechanical device having a rotational axis and a longitudinal axis. An anchor structure is disposed on the substrate proximate the longitudinal axis of the micromechanical device and there are first and second support members extending outwardly oppositely from the anchor structure. First and second flexures extend inwardly in the direction of the axis of rotation of the micromechanical device from the first and second support members, respectively, to the micromechanical device for suspending the micromechanical device from the substrate.

In a preferred embodiment the anchor structure may include at least two anchor device disposed on either side of the longitudinal axis and they may be symmetrically disposed about it. The anchor structure may include at least two anchor devices disposed on either side of the rotational axis and they may be symmetrical about that axis. Each anchor device may include a pair of anchor elements, the anchor elements within each pair being symmetrically disposed about the rotational axis and the pairs of anchor elements being symmetrically disposed about the longitudinal axis. The substrate may include glass and the micromechanical device may include silicon. The support members may extend approximately to the longitudinal edge of the micromechanical device. The micromechanical device may be a pendulous accelerometer with a proof mass.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
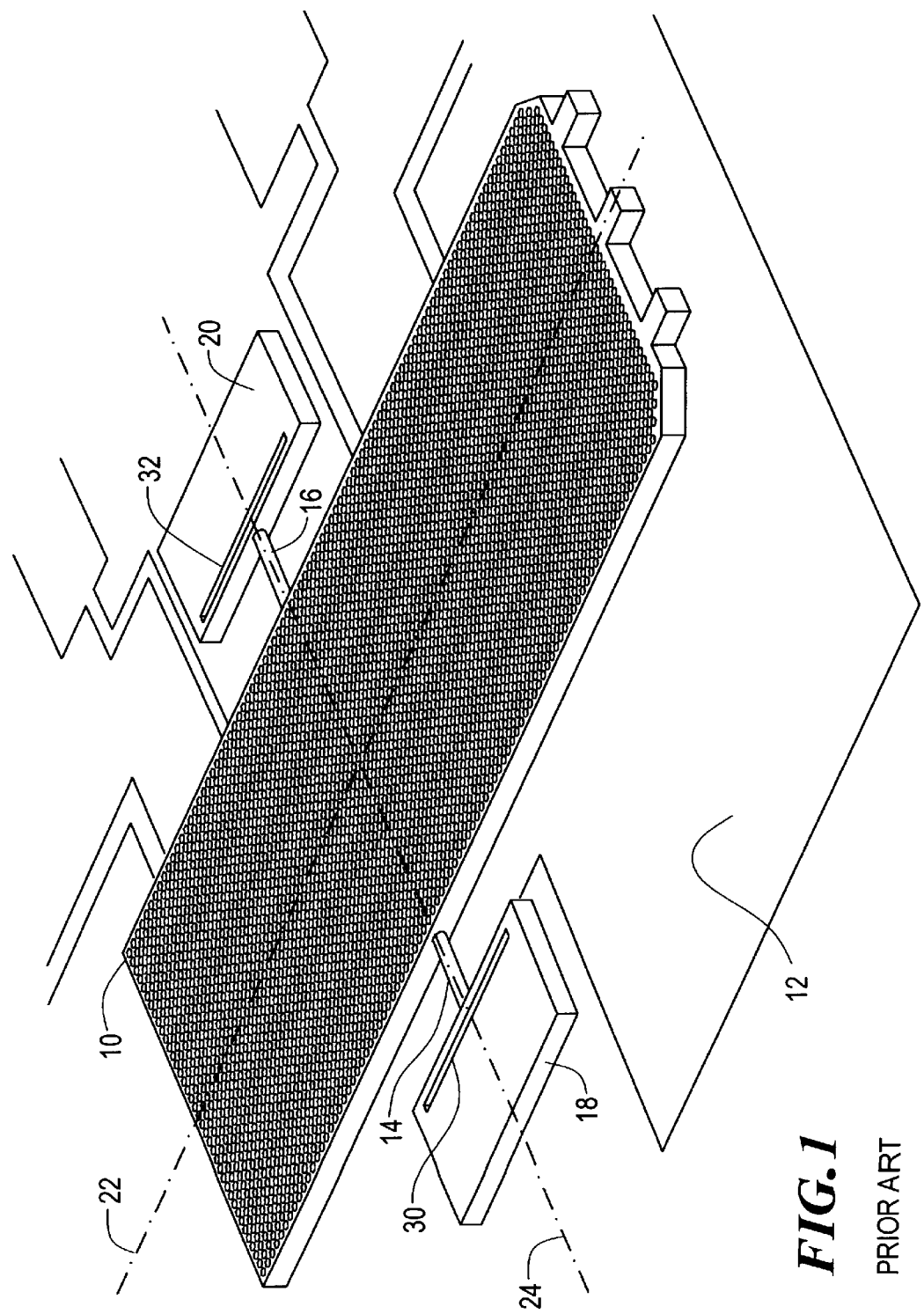
FIG. 1 is a three dimensional diagrammatic view of a prior art flexure support for a micromechanical device such as a proof mass for a pendulous accelerometer.

There is shown in FIG. 1 a prior art flexure support for a micromechanical device. In this embodiment the micromechanical device includes proof mass 10 for use in an accelerometer or inertial measurement system. Proof mass 10 is typically made of silicon and may have a honeycomb construction as shown to minimize squeeze film damping between it and the substrate 12. It is suspended above substrate 12, which may be made of glass, by means of flexures 14 and 16 carried by anchors 18 and 20 which are mounted on substrate 12. Proof mass 10 is longer along its longitudinal axis 22 than it is in the direction of its output axis of rotation axis 24 and operates like a seesaw to rotate on flexures 14, 16 about rotational axis 24 in response to an acceleration. Because the anchors 18 and 20 are spaced apart a substantial distance and because they are of different material, namely silicon, than the substrate 12, which is glass, changes in temperature cause differential thermal expansion between the silicon members 10, 14, 16, 18 and 20 and the glass substrate 12 on which anchors 18 and 20 are mounted. This differential induces a twist or rotation of proof mass 10 that is erroneously detected as an acceleration Strain relief beams 26 and 28 formed in anchors 18 and 20 by virtue of slots 30 and 32 effect some compensation but not sufficient for accuracy desired in the milli-g range.

The apparatus shown in FIG. 1 is combined with sensing and drive circuitry in a typical accelerometer so that, for example, capacitive sensors on substrate 12 beneath proof mass 10 sense the proximity of proof mass 10 to substrate 12 as an indication of the rotation and thus the acceleration experienced in an open loop circuit. In a closed loop circuit the capacitive sensors may provide an output to a feedback loop which drives torquers that apply a force to rotate proof mass 10 in the opposite direction from a sensed acceleration so that proof mass 10 ideally always stays in a level position and the voltage required to keep it in that position against the various experienced accelerations constitutes a measure of those accelerations. All of this is well known in the prior art and can be found in 'Institute of Navigation, 52$^{nd}$ Annual Meeting', Jun. 19–21, 1996, Cambridge, Mass., *Silicon Accelerometers*, P. Greiff, R. Hopkins, R. Lawson; 'Transducers 89,' Jun. 25–30, 1989, Montreux, Switzerland, *Monolithic Silicon Acceleromter*, B. Boxenhorn and P. Greiff; and 'AIAA Guidance, Navigation and Control Conference,' Aug. 14–16, 1989, *An Electrostatically Rebalanced Micromechanical Accelerometer*, B. Boxenhorn and P. Greiff.

Figure 2:
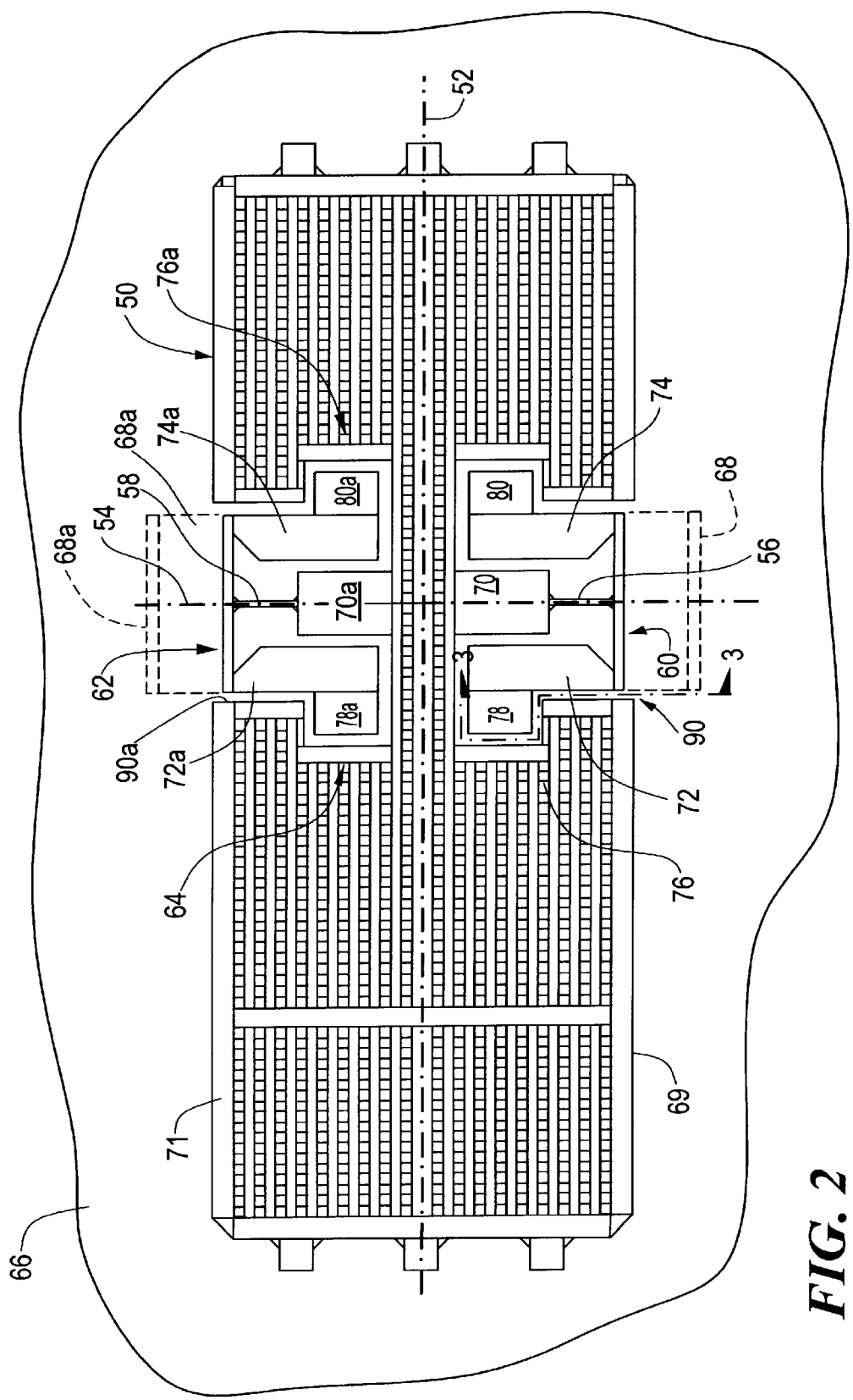
FIG. 2 is a top plan diagrammatic view of a low thermal strain flexure support according to this invention.
Figure 3:
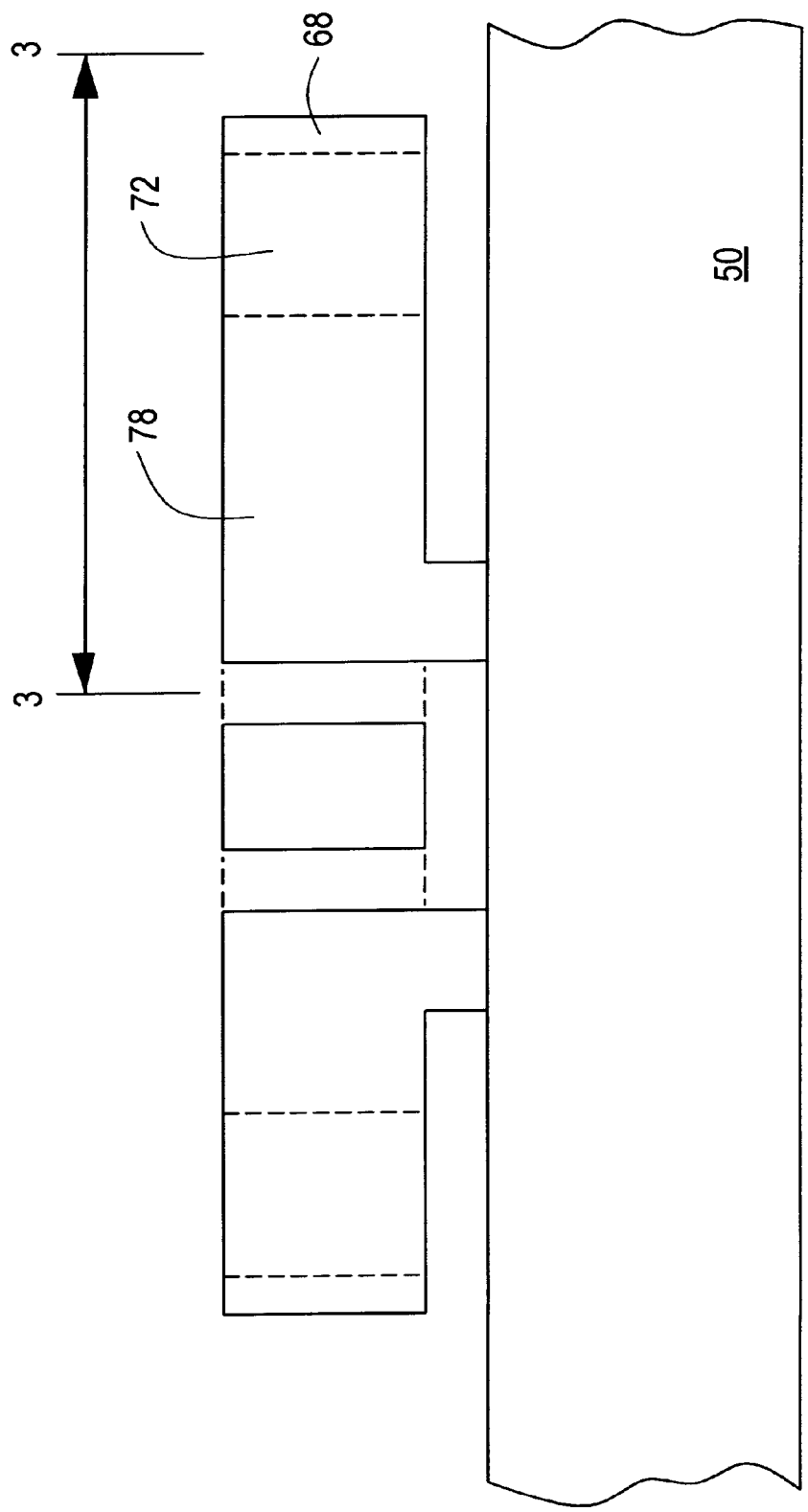
FIG. 3 is a diagrammatic side elevation view of one of the support members taken along line 3—3 of FIG. 2.

In accordance with this invention, micromechanical device silicon proof mass 50, FIG. 2, having longitudinal axis 52 and output rotational axis 54 is supported on flexures 56 and 58 by support members 60, 62 which extend from anchor structures 78, 78a, 80 and 80a mounted on glass substrate 66. All of the structures except the glass substrate 66 may be silicon. Flexure 56 extends between strain relief beam 68 of support member 60 and shoulder 70 which is apart of proof mass 50. Although the outer end of flexure 56 at strain relief beam 68 is shown more or less aligned with the longitudinal edges 69, 71 of proof mass 50, this is not a necessary limitation of the invention as it may be closer to the longitudinal axis 52, or farther beyond the edges as shown in phantom. Element 68 serves the function of both support for flexure 56 and strain relief for any residual stress in the flexure resulting from the fabrication process. Strain relief beam 68 is carried by a pair of arms 72, 74, FIG. 2, which extend outwardly from anchor device 76 which in this case includes two anchor elements 78 and 80 Proof mass 50 is provided with two recesses 90. 90a to accommodate the support members 60, 62 and flexures 56 and 58. Support member 62 is identical and oriented as a mirror image of support member 60 and its parts have been given like numbers accompanied by a lower case a.

Anchor structure 64 is shown here as including two anchor devices 76 and 76a arranged on either side of longitudinal axis 52 and in fact symmetrically oriented about it, and each of the anchor devices 76, 76a is shown to include two anchor elements 78, 80 and 78a, 80a, respectively, which are disposed on either side of rotational axis 54 and in fact are symmetrically disposed about it. This is a preferred construction as it is desirable to make the anchor regions as symmetric as possible with respect to any thermally induced strains between the proof mass flexures and the anchor regions attached to the glass substrate. In addition it is desirable to locate the intersection of the longitudinal and output axis at the center of any geometric thermal distortion of the package such that strain induced by the device package be applied symmetrically to the anchor regions and flexures as well.

Regardless of the particular construction of anchor structure 64, it is important to note that it is positioned close to the center of proofmass 50 and that the various parts of the anchor structure are placed as close together as possible to minimize the distance between them and thus minimize the thermal differential that can occur when the mounts are made of one material such as silicon and the substrate is made of another, such as glass. Further even though the mounts are on the interior of proof mass 50 and close to its center, the supporting flexures can actually extend outwardly to near, at or beyond its longitudinal edges to provide greater rotational stability.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A low thermal strain flexure support for a micromechanical device comprising:

a substrate;

a micromechanical device having a rotational axis and a longitudinal axis;

an anchor structure disposed on said substrate proximate the longitudinal axis of said micromechanical device;

first and second support members, extending outwardly oppositely from said anchor structure first and second flexures, extending inwardly in the direction of the axis of rotation of said micromechanical device from said first and second support members, respectively, to said micromechanical device for suspending said micromechanical device from said substrate.

2. The low thermal strain flexure support of claim 1 in which said anchor structure includes at least two anchor devices disposed on either side of said longitudinal axis.

3. The low thermal strain flexure support of claim 1 in which said anchor structure includes at least two anchor devices disposed on either side of said rotational axis.

4. The low thermal strain flexure support of claim 2 in which each said anchor device includes a pair of anchor elements, the anchor elements within each pair being symmetrically disposed about said rotational axis and the pairs of anchor elements being symmetrically disposed about said longitudinal axis.

5. The low thermal strain flexure support of claim 1 in which said substrate includes glass.

6. The low thermal strain flexure support of claim 1 in which said micromechanical device includes silicon.

7. The low thermal strain flexure support of claim 1 in which said support members extend approximately to the longitudinal edges of said micromechanical device.

8. The low thermal strain flexure support of claim 1 in which said micromechanical device is pendulous accelerometer with a proof mass.

* * * * *